United States Patent [19]

Giles et al.

[11] Patent Number: 5,028,918
[45] Date of Patent: Jul. 2, 1991

[54] IDENTIFICATION TRANSPONDER CIRCUIT

[75] Inventors: Thomas E. Giles, Oxfordville; William N. Reining, Madison, both of Wis.

[73] Assignee: Dairy Equipment Company, Madison, Wis.

[21] Appl. No.: 452,538

[22] Filed: Dec. 18, 1989

[51] Int. Cl.⁵ .................................... H04B 5/00
[52] U.S. Cl. .......................... 340/825.54; 119/51.02
[58] Field of Search ........... 340/505, 572, 573, 825.3, 340/825.31, 825.34, 825.54, 825.57, 825.58; 119/51.02, 155; 128/903; 455/16, 41; 235/449, 450; 342/51, 44

[56] References Cited

U.S. PATENT DOCUMENTS

| | | |
|---|---|---|
| 3,855,592 | 12/1974 | Davis et al. . |
| 3,981,011 | 9/1976 | Bell, III . |
| 4,067,011 | 1/1978 | Althaus . |
| 4,114,151 | 9/1978 | Denne et al. .................. 455/605 |
| 4,196,418 | 4/1980 | Kip et al. . |
| 4,262,632 | 4/1981 | Hanton et al. . |
| 4,281,664 | 8/1981 | Duggan ........................ 128/903 |
| 4,325,146 | 4/1982 | Lennington . |
| 4,333,072 | 6/1982 | Beigel . |
| 4,345,253 | 8/1982 | Hoover . |
| 4,364,043 | 12/1982 | Cole et al. .................. 340/825.54 |
| 4,399,437 | 8/1983 | Falck et al. . |
| 4,459,590 | 7/1984 | Saulnier .................... 340/825.54 |
| 4,463,353 | 7/1984 | Kuzara ..................... 340/825.54 |
| 4,463,706 | 8/1984 | Meister et al. . |
| 4,473,825 | 9/1984 | Walton . |
| 4,475,481 | 10/1984 | Carroll . |
| 4,510,495 | 4/1985 | Sigrimis et al. ............ 119/51.02 |
| 4,514,731 | 4/1985 | Falck et al. . |
| 4,517,563 | 5/1985 | Diamant . |
| 4,531,526 | 7/1985 | Genest ......................... 128/903 |
| 4,532,892 | 8/1985 | Kuzara . |
| 4,625,730 | 12/1986 | Fountain et al. ............. 128/903 |
| 4,691,202 | 9/1987 | Denne et al. ............. 340/285.54 |
| 4,854,328 | 8/1989 | Pollack ....................... 128/903 |

Primary Examiner—Donald J. Yusko
Assistant Examiner—Dervis Magistre
Attorney, Agent, or Firm—Quarles & Brady

[57] ABSTRACT

A phase encoded transponder circuit is disclosed which may be a passive device capable of response to an interrogating signal and is capable of transmitting an individual unique identification code. The transponder is particularly useful for identifying an individual, such as an animal, associated with the transponder. The code is stored in a memory device which is also loaded with several flags to actuate optional states of the system. One set of flags enable a state in which up to three additional words of the message are transmitted by the transponder. These additional words may be fixed internal data or variable data sent to the circuit by an external data module. Another state permits the importation into the transponder of an unlimited stream of external data from a connected device, so that the transponder can be used to transmit a variety of data about the individual associated with the transponder to the interrogation station.

16 Claims, 8 Drawing Sheets

DATA FORMAT TABLE

|    | WORD 0 | WORD 1 | WORD 2 | WORD 3 | WORD 4 | WORD 5 | WORD 6 | WORD 7 |
|----|--------|--------|--------|--------|--------|--------|--------|--------|
| B9 | STOP   | STOP   | STOP   | STOP   | STOP   | STOP   | STOP   | STOP   |
| B8 | PAR    | PAR    | PAR    | PAR    | PAR    | PAR    | PAR    | PAR    |
| B7 | W6EN   | ID 17  | ID 11  | ID 5   | W4D7   | W5D7   | W6D7   | XOR5   |
| B6 | W5EN   | ID 16  | ID 10  | ID 4   | W4D6   | W5D6   | W6D6   | XOR4   |
| B5 | W4EN   | ID 15  | ID 9   | ID 3   | W4D5   | W5D5   | W6D5   | XOR3   |
| B4 | ID 20  | ID 14  | ID 8   | ID 2   | W4D4   | W5D4   | W6D4   | XOR2   |
| B3 | ID 19  | ID 13  | ID 7   | ID 1   | W4D3   | W5D3   | W6D3   | XOR1   |
| B2 | ID 18  | ID 12  | ID 6   | ID 0   | W4D2   | W5D2   | W6D2   | XOR0   |
| B1 | SYNCH  | 0      | 0      | 0      | 0      | 0      | 0      | 0      |
| B0 | START  | START  | START  | START  | START  | START  | START  | START  |

FIG. 7

IDENTIFICATION TRANSPONDER CIRCUIT

FIELD OF THE INVENTION

The field of the present invention relates to transponders used to identify objects using radio wave transmissions and relates, in particular, to passive transponders which can transmit coded information in response to an interrogating signal from an interrogating device.

BACKGROUND OF THE INVENTION

Electronic identity tags using transponders are used in the art to identify and monitor objects remotely. One particular utility for such transponders is to identify livestock, which can wear transponders uniquely identifying each of the individual animals. Fixed interrogating devices can then emit an electromagnetic wave transmission to interrogate the transponders when the animal is in range of the interrogator, to automatically identify animals as they pass certain stations. Such identification transponders can be commonly employed as a means of providing herd management, security systems, and inventory or process control and to monitor the functions of the animal such as feeding, body temperature, and milk production. Such electronic transponder tags commonly transmit fixed information that merely identifies the object or animal. Such transponders are also having identification in other uses in which it is desired to transmit automatically certain other information about the object or individual to which the transponder has been associated.

In the prior art it has generally been the case that the transponders which have been developed can generate a code which uniquely identifies a particular animal. For example, in U.S. Pat. No. 4,463,353 to Kuzara, such an electronic tag identification system is disclosed which is passive, receiving its power from a source of interrogating electromagnetic RF radiation, and which sends back a coded identifying signal in response to the interrogating pulse. U.S. Pat. No. 4,114,151 to Raymond et al. discloses a similar passive transponder system in which the passive transponder is powered by the RF signal received from the interrogating device, and in which the transponder is capable of generating a code to the interrogating device so as to digitally identify the transponder to the interrogating device. Many other examples in the art have known of the general concept of passive transponders capable of sending a digital code to the interrogating unit. Such devices are normally single state devices operable only in a single mode and accordingly must be hard wired or fixed in their programming to transmit a single data pattern which is normally not alterable by the user. Accordingly, a desirable feature in such transponder is the ability to incorporate the transmission of more and varied information as the management of the animals becomes more sophisticated requiring the desirability of additional monitoring of other parameters, such as temperature, time in lactation, weight and other factors related to the day-to-day life of the animal.

SUMMARY OF THE INVENTION

The present invention is summarized in that a phase encoded transponder circuit includes a previously loaded set of data words which includes an individual unique identification code. When the circuit is interrogated, the code is read out of the memory and transmitted in a serial phase encoded form to the interrogating unit. The circuit scans the data from the memory for certain flags which enable the transmission of other data as well. If data is to be transmitted, it is received in parallel from a connecting data module and transmitted in serial phase encoded form in the same format as the identification code.

In accordance with the present invention, a passive transponder is disclosed which upon initialization transmits a cyclical data pattern which consists of fixed identification words, as well as ancillary data inputs received by the transponder or program inputs that are programmed into a one-time programmable memory that is part of the transponder.

It is an object of the present invention to provide a transponder which is a state machine as to allow the transmission of different data patterns in different data states of the transponder.

It is another object of the present invention to provide such a transponder which is programmable by the user to take advantage of a variety of option features without changing the basic coded animal identification feature of the transponder.

It is another object of the present invention to provide a transponder which uniquely identifies animals or other objects, in which the transponder is associated in a swift and efficient fashion, utilizing a unique protocol of interrogation and response.

Further objects, advantages, and features of the present invention will become apparent from the following detailed description taken in conjunction with the accompanying drawings.

BRIEF DESCRIPTION OF THE INVENTION

FIG. 7 is a table illustrating the protocol of the message transmitted by the transponder of the present invention.

DETAILED DESCRIPTION OF THE INVENTION

Figure 1:
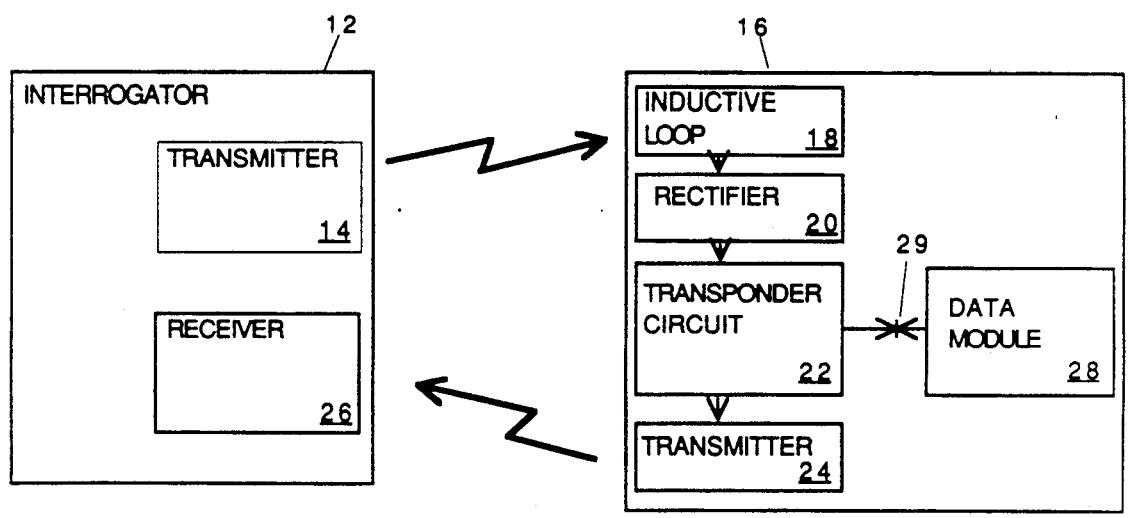
FIG. 1 is a schematic view of the transponder system constructed in accordance with the present invention.

Illustrated in FIG. 1 is the general concept of a interrogator transponder installation utilizing the phase encoded transponder circuit of the present invention. An electromagnetic, and preferably radio frequency, signal transmitter 14 located in the interrogator 12 sends a radio frequency signal to the identification unit 16. The identification unit 16 has in it a receiver including an inductive loop 18 which feeds its power to a rectifier 20. The output of the rectifier 20 is provided to the phase encoded transponder circuit 22 the output of which is directed to a transmitter 24. The transmitter 24 directs the phase encoded output of the transponder to a receiver 26 located in the interrogator 12. Also a special optional external data module 28 is secured through a connector 29 to the circuit 22. The external data module 28 includes circuitry to monitor special parameters of the individual being tagged such as, for an animal, body temperature and motion pattern.

In general, the transponder is a passive device, without its own internal power supply, which receives a radio frequency or a clock input signal from the interrogator, accumulates voltage through the inductive coil from the input signal and then uses the voltage from the interrogating signal to power the phase encoded transponder which transmits the appropriate response back to the interrogator. In some applications, batteries may be used to power the transponder thereby removing the need to gain power from the interrogating or clocking signal. The response is transmitted through the transmitter back to the interrogator, so that information can be remotely conveyed thereto. The particular information which is conveyed is determined by the internal programming of the transponder circuit, which will be described in the balance of this specification here.

In general, as will be described in further detail below, the transponder circuit 22 of FIGS. 2–6 is capable of transmitting repetitively a message composed of up to eight ten-bit "words." At least portions of the first four transmitted words will include the individual-unique identification code. The remaining portions of the message, if enabled during programming, can either include fixed information such as more coding, can include information for other purposes loaded in the circuit, or can include the transmission of data from the external data module 28.

Figure 2:
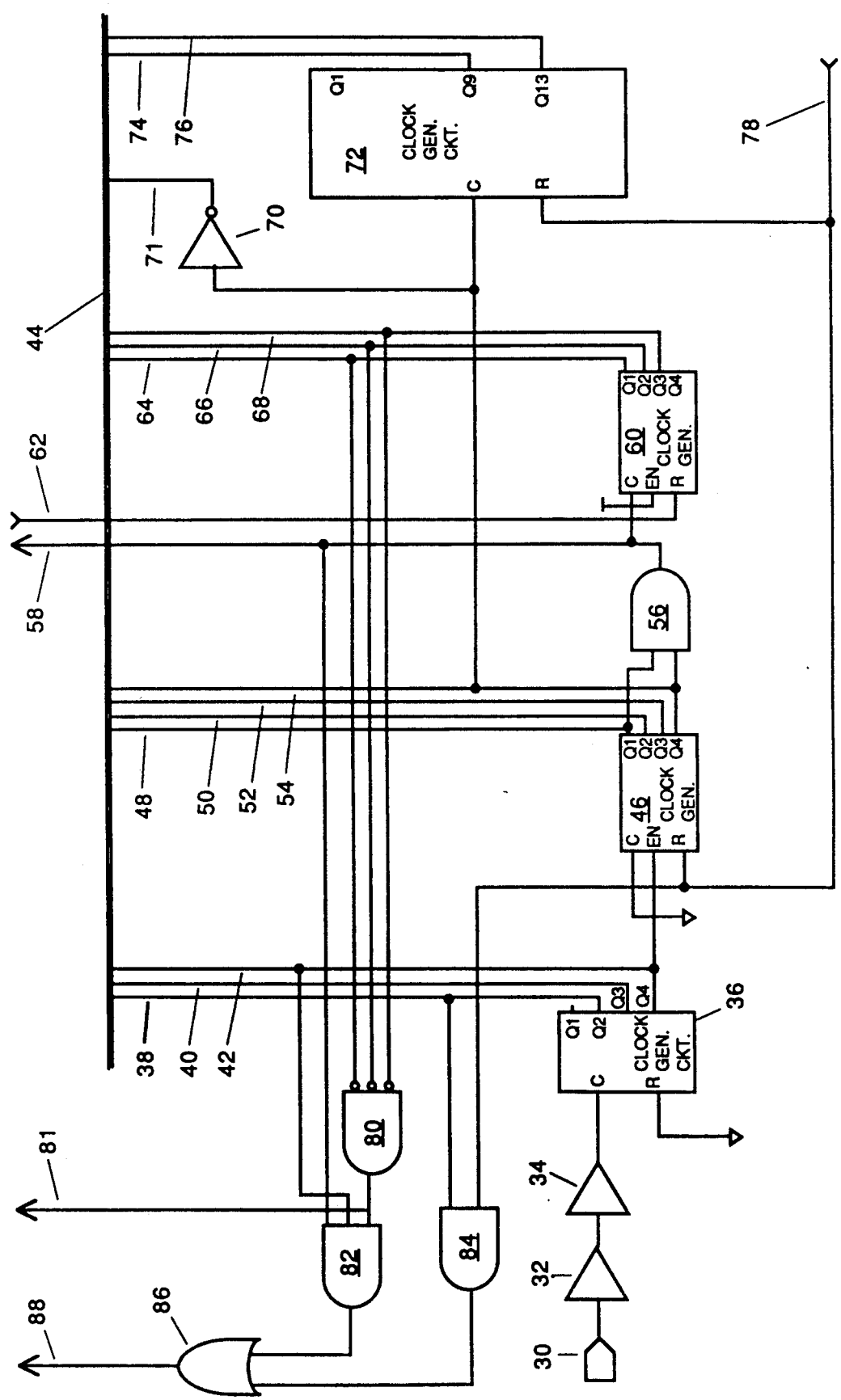
FIG. 2 is a schematic representation of a portion of the phase encoded transponder circuit for use within the system of FIG. 1.

Illustrated in FIG. 2 is a portion of the phase encoded transponder circuit which includes the timing and clock generating circuitry. The circuit of FIG. 2 begins with an input labelled 30, from the connector 29, which is intended to be a base clock frequency for the transponder. The clock frequency can be determined by a crystal or other equivalent oscillating means incorporated into the transponder or can be derived from the interrogating clock frequency, if that frequency is generated at an appropriate frequency. In the embodiment described here the input basic clock frequency, designated fc, is 38.4 kilohertz. The input 38.4 kilohertz signal is then provided as an input to a pair of cascaded schmitt trigger buffer circuits 32 and 34. The output of the schmitt trigger buffer 34 is provided as an input to a first clock generator circuit 36. The clock generator circuit 36 is simply a cascaded binary counter intended to divide the input clock frequency down into lower frequency clock pulses. Thus the output of the clock generator 36 includes three clock lines designated 38, 40 and 42, which are operating at 9.6 kilohertz (fc/4), 4.8 kilohertz (fc/8), and 2.4 kilohertz (fc/16) respectively. The clock generating circuit 36 is clocked continuously, and thus its outputs continuously emit square waves of the respective frequencies. The clock lines 38, 40 and 42 are also carried on a circuit wide system bus, designated at 44, the connections to which will appear in other portions of the circuitry contained in FIGS. 3–6. The system bus 44 includes twelve clock signal lines, eight data lines, and eight control signal lines. The clock signal 42 sets the bit time of the transmission message of the transponder circuit 22 of FIGS. 2–6. Thus each bit is transmitted in 16 clock cycles or approximately 416 microseconds. All bit dependent portions of the circuit of FIGS. 2–6 and thus dependent on the clock signal 42.

The 2.4 kilohertz (fc/16) clock signal on line 42 is also connected as an input to a second cascaded clock generator 46, which is simply a BCD up-counter arranged to count the input pulses on the clock line 42. The output signals of the second cascaded clock generator 46, designated 48, 50, 52, and 54 are clocking signals having lower frequencies of 1.2 kilohertz (fc/32), 600 Hz (fc/64), 300 Hz (fc/128), and 150 Hz (fc/160) respectively. The second cascaded clock generator 46 is intended to generate the clock signal which increments once for each bit transmission by the phase encoded circuitry, as will become apparent from further discussions below, and the clock lines 48, 50, 52 and 54 are further carried therefore on the system bus 44. The clock signals 48, 50, 52 and 54, which are not simple square wave signals, may then be used as a representation of the bit number location for the transmission of each word by the circuit. The least significant and most significant outputs of the counter 46, on the clock lines 48 and 54, are also connected to an AND gate 56. The output of the AND gate 56 is carried on a signal line referenced at 58, which exits the portion of the circuit illustrated in FIG. 2, and which is also connected as an input to a third stage clock generator 60. The signal line 58 goes high when there is a nine in counter 46, and is low on all other counts, to thus indicate the end of a word transmission. The third stage clock generator 60 is also a BCD up-counter, counting the input clock pulses thereto, to thus be clocked once per word. The reset input to the clock generator 60 is connected to a signal line 62 controlled outside of the circuited portion illustrated in FIG. 2. The outputs of the clock generator 60 include three timing signal lines, designated 64, 66 and 68, which carry non-square wave timing, signals representing word timing of one word (fc/2560 or 75 Hz), two words (fc/5120 or 37.5 Hz) and four words (fc/10240 or 18.75 Hz) respectively. The third stage cascaded clock generator 60 thus represents the word clock and the number (or location) of the word being transmitted at any instant can be determined from clock lines 64, 66 and 68. The clock signals 64, 66, and 68 are therefore carried on the system bus 44. The clock line 54, representing 150 Hz, is further inverted by an inverter 70 and carried on the system bus 44 as signal line 71 and is further connected as an input to another clock generating circuit 72. The clock generating circuit 72 is a binary ripple counter having a pair of output clock lines 74 and 76 which represent fc/81920 or 1.17 Hz and (fc/1310720 or 0.0732 Hz respectively. Both of the clock lines 74 and 76 are carried on the system bus 44. A reset line 78 extends into the timing and clock circuit generator circuit of FIG. 2, and is connected to the second cascaded bit clock generator 46 and the fourth cascaded clock generator 72, so as to reset both of those circuits. Thus the signal line 48, when combined with a signal line 54, creates an output of the AND gate 56 which goes high once per eight bits of operation of the circuitry. Thus the signal line 58 is intended to be a tenth bit counter, used for stop bit signal generation. The combination of the signal lines 64, 66 and 68, which are created by the word clock generator 60 indicate, when all are low, the beginning of data word "zero," and thus those three signal lines 64, 66 and 68 are combined by an inverting AND gate 80 to create an output signal 81 indicating the commencement of a word "zero" (i.e. the first word) output of the circuit. The commencement of a word is indicated by the ending of the previous word, the completion of the stop bit, and a timing pulse indicating the new word is to start. Those three signals are combined at AND gate 82, which combines the output of gate 80 indicating the beginning of word zero, the output from gate 56, indicating the stop bit, and the bit clock 42. Thus the output of gate 82 goes high to indicate the ninth bit time of word zero. The reset signal 78 is connected as an input to an AND gate 84, with the high frequency clock 38. The output of gate 84 is connected as one input to an OR gate 86, which combines the output of the gate 84 with the output of word enable gate 82, to create a word enable signal 88, used in a different part of the circuitry of the phase encoded transponder of the present invention.

Figure 3:
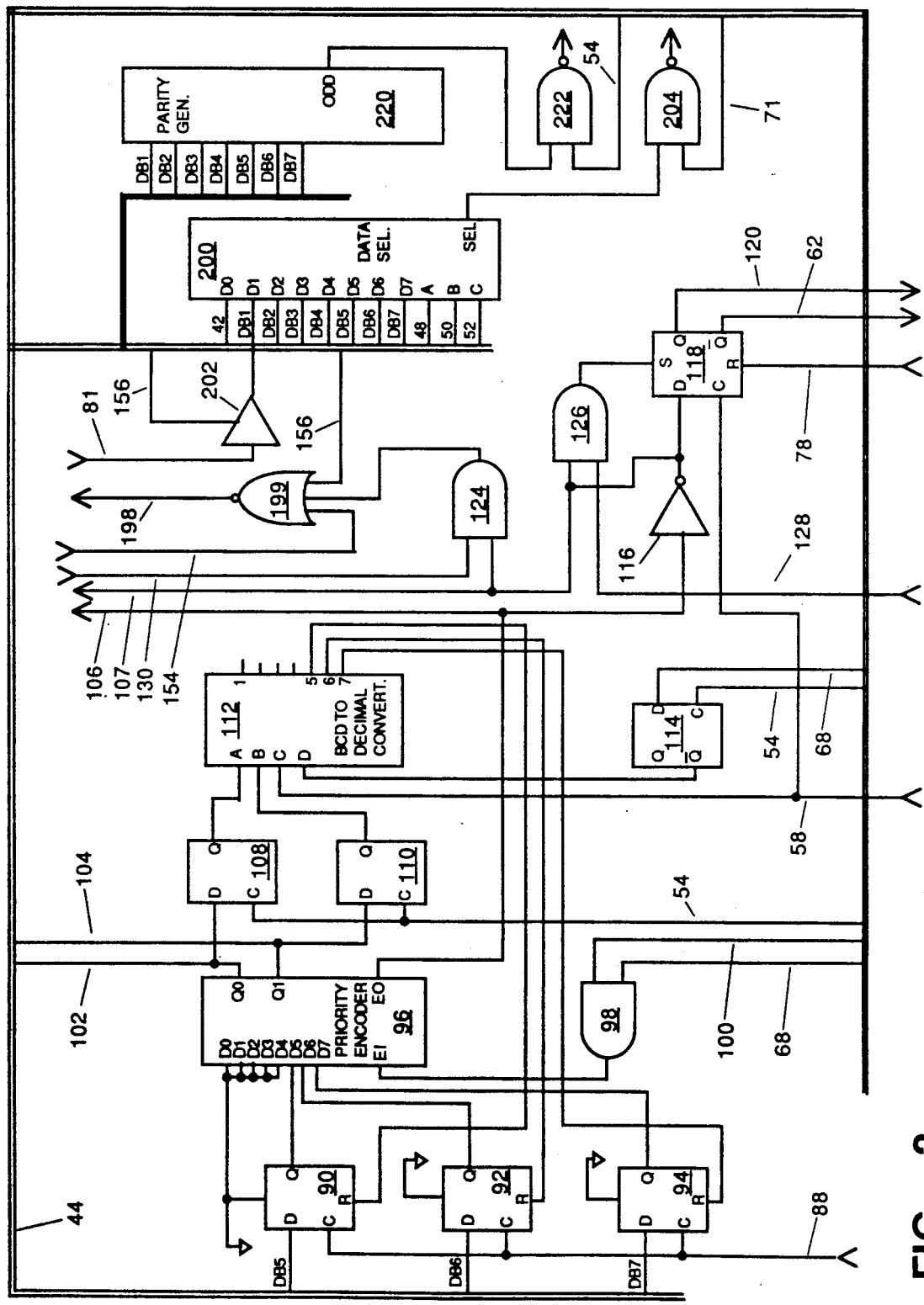
FIG. 3 is a schematic representation of yet another portion of the circuit of the transponder of FIG. 1.

As illustrated in FIG. 3, the word enable line 88 is connected as a clock input to a series of word enable latches 90, 92 and 94, and is also carried on the system bus 44. Each of the word enable latches 90, 92 and 94 is designed to indicate and enable the transmission of a certain word of additional data during the data transmission from the phase encoded transponder circuit. The clock input to each of the word enable latches comes from the signal line 88. The data inputs to each of word enable latches 90, 92, and 94 are connected to signal lines DB5, DB6, and DB7, respectively, which are the fifth, sixth and seventh bit of the data bus on the system bus 44. The output of the three word enable latches 90, 92 and 94 are each connected as inputs to an eight bit priority encoder 96. An enable input to the priority encoder 96 is received from the output of an AND gate 98, whose two inputs include the clock signal 68 and a normally-high signal 100 generated elsewhere in the circuit, as will be described later. The output from the gate 98 activates the chip enable during appropriate time periods for data words four, five, and six, i.e. after the transmission of the first four words and when the timing of the transponder has not expired. Thus clock signal line 68, which goes high at the end of data word three, is passed through the gate 98 to enable the priority encoder 96 during words four, five, and six. The output of the priority encoder 96 consists of three output lines two of which, designated 102 and 104, are the two priority encoded output bits of the priority encoder, designated Q0 and Q1. The third output from the priority encoder 96 is an enable output line which is normally low and which is intended to be positive when there are no priority inputs present as expressed through the priority encoder. Thus, the enable output signal line 106 goes positive when there are no priority inputs present, to enable the external data port, and also when the system has completed transmitting the second half of a data frame, as will be discussed in greater detail below. The priority encoded signal lines Q0 and Q1 function as the address of words four, five, and six. A positive in Q0 and Q1 indicating word four, a zero in Q0 indicating word five, a zero in Q1 indicating word six, and a zero in both indicating no address.

A pair of latches 108 and 110 have their data inputs connected to the signal lines 102 and 104 from the priority encoder 96 so as to latch and hold the outputs thereof. The clock signals to the two latches 108 and 110 are connected to the 150 Hz clock 54 which, clocking the eighth bit in each word, latches the latches 108 and 110 in place holding the outputs of the priority encoder once during the eighth bit of transmission of each word by the circuit. The outputs of the latches 108 and 110 are connected as inputs to a BCD to decimal converter circuit 112. The other inputs to the BCD to decimal converter input include the stop bit signal 58, and the output of a flip-flop 114. The flip-flop 114 has its clock input connected to the eighth bit clock line 54 while its data input is connected to the fourth word clock signal line 68, to thus clock the flip-flop 114 positive during the last four words of the transmission of the circuit. Thus, during the second half of the data transmission, a one is imposed on the output of the flip-flop 114. The function of the BCD to decimal converter 112 is to create selected positive outputs indicating when each of the last four words of the data message have been transmitted. The output signals of the BCD to decimal converter are thus connected to the reset inputs of the word enable latches 90, 92 and 94, to thus reset each of the three latches after the particular word enabled by that latch has been transmitted. In other words, when the fourth data word is to be transmitted, the latch enable 90 for that word is positive and that signal is transmitted through the priority bit encoder 96. The output of the eight-bit prior encoder 96 is clocked into the flip-flops 108 and 110 by the eighth-bit clock 54 as the eighth bit of each word is started. At the same time, because word four is being transmitted, signal line 68 is high so flip-flop 114 is clocked. The combination of the signals into the decoder 112 causes its output signal line connected to the reset to latch 90 to actuate to reset that latch. A similar process happens for the word enable latches 92 and 94 during words five and six. Thus the word enable latches 90, 92, and 94 serve to enable words four, five, and six of the data message of the transponder, and are reset when each individual word is completed by the output lines from the BCD to decimal converter 112.

The enable output of the priority encoder 96, indicating transmission of the second half of the data frame, i.e. words four through six, is also connected through an inverter 116 to the data input to a flip-flop 118. The flip-flop 118 has its clock input connected to the stop bit time signal 58 and thus the flip-flop 118 is clocked into the state of the output of inverter 116 during each stop bit. Thus the flip-flop 118 is normally set during the transmission of data words zero through six, but is set for one word cycle from the eighth bit of the last data word until it is reset, or clocked low by another data word. The flip-flop 118 has a true output 120 and an inverted output 122 connected off of the portion of the circuit as illustrated in FIG. 3. The output of the inverter 116 is also connected as an input to a pair of AND gates 124 and 126. The other input to the AND gate 126 is a preset signal 128, intended to preset up the flip-flop 180. The other input to the AND gate 124 is a signal line designated 130, the derivation of which will be discussed further below.

Figure 5:
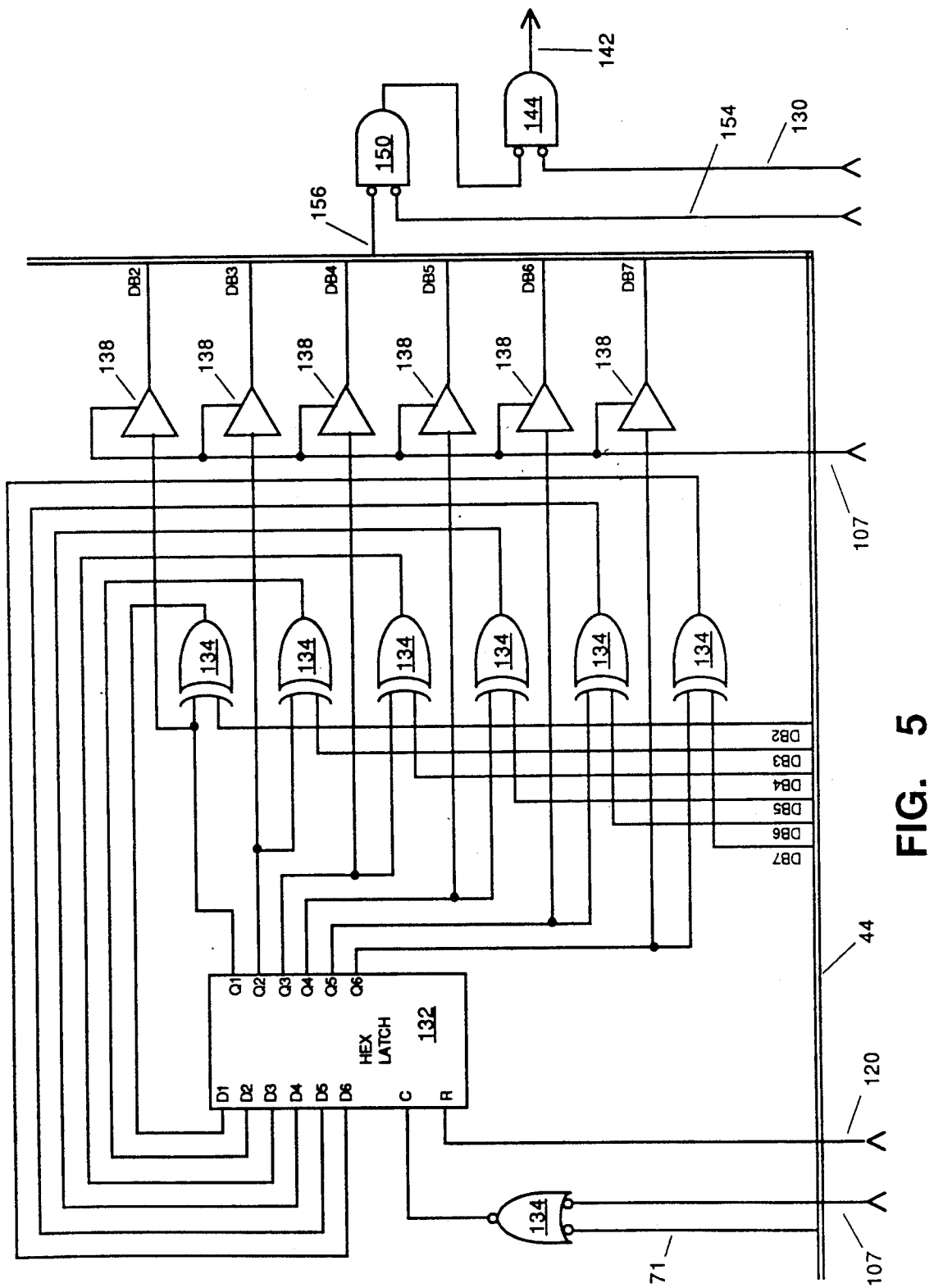
FIG. 5 is a schematic representation of yet another portion of the circuit of the transponder of FIG. 1.

Turning for the moment from FIG. 3, in FIG. 5 is a portion of the circuit intended to generate the word seven, which is the eighth word of the eight word transmission created by the transponder of the present invention. In general terms, the transponder of the present invention generates up to an eight word message (the words labeled zero through seven), with each word consisting of a start bit, a synchronization bit, a six bit data word, a parity bit, and a stop bit, thus creating a total word length of ten bits. The message format is illustrated in FIG. 7. The first four words, i.e. words zero through three, contain information identifying the individual associated with the transponder and are always transmitted. Data words four, five and six may optionally also be transmitted and may contain a variety of engineering or other information data as will be described in greater detail below. The last word is always a data transmission check word which includes the appropriate start, synchronization, parity, and stop bit. Each data bit of the word seven is an exclusive-OR combination of all of the corresponding bits of the first seven words. The creation of this last exclusive-OR word is done for error checking purposes, and is accomplished by the portion of the circuit illustrated in FIG. 5.

A hex D-type flip-flop 132 is connected so that each of its inputs is connected to an output of one of six identical exclusive-OR gates 134. Each of the exclusive-OR gates 134 has one of its inputs connected to the corresponding output of the hex flip-flop 132, and has its other input connected to a corresponding bit of the parallel data lines DB2 through DB7 carried on the system bus 44. The clock circuit to the hex flip-flop 132 is connected to the output of a gate 134, which is effectively an AND gate. There are two inputs to the gate 134, one input to which is the output of the inverter 70 illustrated on FIG. 2, which is the inverted signal representing bit time eight, and the other input to which is the signal line 107, which is the output of the inverter 116 connected to invert the enable output of the eight bit priority encoder 96. The net effect of the combination of the signals through the gate 134 is to clock the latch once at the termination of the generation of each word of the message to be transmitted by the transponder circuit, at least for words zero through six. At each positive edge on line 71, at the end of the bit time for each word, the various bits of the current data word are combined by exclusive-OR, bit-by-bit with the contents of the hex latch 132. Thus the data words are combined bit-by-bit as they are generated, in an exclusive-OR fashion, and the results are stored in the hex latch 132. A series of six output tri-state buffer drivers 138 are provided, the input to each of which is the output of each bit of the hex latch 132, so that the output six bits of the hex latch can be imposed onto the data bus to create word seven of the data message. The enable signal to the six buffer drivers 138 is connected to signal line 107, to thus enable those latches upon the completion of the transmission of the prior words of the message. The outputs of the buffer drivers are therefore connected on a bit-by-bit basis to each of the six data bits DB2 to DB7 of the data bus contained on the system bus 44. An exclusive-OR clear line is the signal line 120, generated by the flip-flop 118 in FIG. 3, which will operate to clear the hex latch 132 upon the completion of the transmission of the last data word, to indicate completion of the transmission of an entire message.

Figure 6:
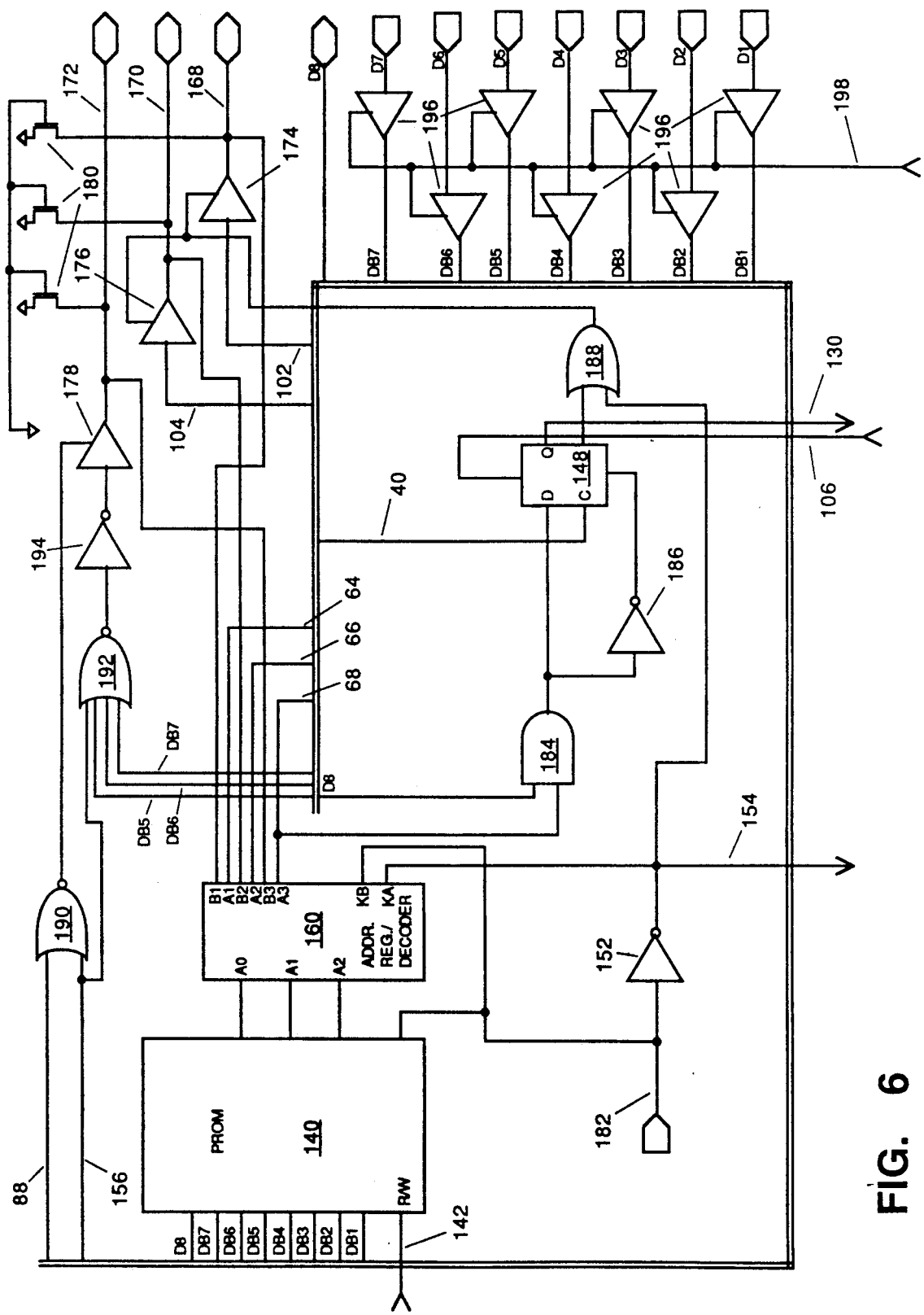
FIG. 6 is a schematic representation of a final portion of the circuit of the transponder of FIG. 1.

Referring now to FIG. 6, indicated at 140 is a programmable read only memory, PROM, one of the central components of the circuit of FIGS. 2-6. The PROM 140 contains a data field of seven bits by up to seven words which is the portion of the memory into which the unique identification information associated with the transponder has been previously written. The PROM 140 thus contains the unique individual identification code which is to be transmitted by the transponder of the present invention. The PROM 140 therefore has as its output connected to data bus lines DB2 through DB7, and D8, which are the same data bus bit lines as illustrated in FIG. 5 and carried on the common system bus 44. A read enable line for the PROM 140 is indicated at 142, and is generated in the circuit portion in FIG. 5. The signal line 142 enabling the PROM 140 is generated by a NOR gate 144 which has two inputs. One input to the gate 144 is the signal line 130, which is the output of a flip-flop 148 illustrated in FIG. 6, and which will be described further below. The other input to the gate 144 is the output of an OR gate 150, which has two inputs. One of the inputs to gate 150, is the output of an inverter 152, designated on FIG. 6 as signal line 154, and the other of which is a signal line 156 carried on the system bus 44, and generated by a flip-flop in FIG. 4, which will also be described below. Without going into the full detail at present, the output of gate 144 is driven so as to enable the PROM 140 so as to present data at its output during the data portion of the first four words of the message transmitted by the transponder circuit of FIGS. 2-6.

Also shown in FIG. 6 is an address register/decoder 160 which supplies three address lines designated 162, 164 and 166 to the PROM 140. The address register/decoder is a data selector which selects one of a pair of three bit data inputs to it to present on its output bits 162, 164, and 166. One set of three input data lines, address bus lines 168, 170 and 172, are also connected to the outputs of a series of three data buffer drivers 174, 176 and 178, and are also connected through the connector 29, as illustrated by the connection termination on the right hand side of FIG. 6. These three address lines are normally held low by appropriate transistors, each of which are labeled 180 in FIG. 6. The other three bits of input lines to the address register decoder 160 consists of the clock signals 64, 66 and 68 which indicate first, second and third bits of the word clock. The particular one of the two three word address input bits that the decoder 160 selects is determined by two input bits. A first of the input bits is indicated by signal line 182 which is connected to an input line connected through the connector 29 off of the circuit, as indicated by the connector symbol underneath the decoder 160 as viewed in FIG. 6. The input signal line 182 is also connected to the programming voltage input to the PROM 140, and is also connected as an input to the inverter 152, where it is inverted to create the signal line 154 which is an input to the gate 150 of FIG. 5. The output of the inverter 152 is also connected to the other input data bit to the address decoder latch 160.

The line 68, indicating words four through seven, and the eighth data bit line D8 from the bus 44 are applied as inputs to an AND gate 184. The output of the AND gate 184 is applied as the data input to the flip-flop 148, and is further inverted through an inverter 186 to be applied to the reset terminal of the flip-flop 148. The clock terminal of the flip-flop 148 is connected to the clock line 40 which is the fc/8 clock signal carried on the system bus 44. Thus the output of the gate 184 is permitted to clock positive at the end of transmission of the word three out of the PROM 140 at any time in which a one appears on the bus bit D8. The preset input to the flip-flop 148 is connected to the signal line 106 which is the enable output of encoder 96 and which goes high when it is desired to transmit words four, five, and six. Thus the flip-flop 148 is intended to signal the transmission of external data by the circuit. The inverted output of the flip-flop 148 is connected as an input to an OR gate 188, the other input to which is the external data signal 182 inverted by the inverter 152 to make the signal 154. The output of the OR gate 188 is connected to enable the buffer drivers 174 and 176, to create a transmit on the address bus lines 170 and 168. Thus either the flip-flop 148 or the input signal line 182 may be used to select the address lines 168 and 170. A NOR gate 190 is connected to a pair of inputs, one of which is the word enable line 88 created by the gate 86 in FIG. 2, and the other of which is the signal line 156, which is the same signal line 156 carried on the system bus 44 which is also an input to the gate 150 on FIG. 5. The signal line 156 is also connected as an input to a four input NOR gate 192, the other three inputs to which are data bits DB5, DB6 and DB7 of the data bus. The output of the NOR gate 192 is connected through an inverter 194 to the input of the buffer driver 178, the enable signal to which is connected to the output of the NOR gate 190.

On the right hand side of FIG. 6 eight input lines are indicated as connecting through the connector 29 to an external data bus. The signal line D8 is connected directly to the internal data bus on the system bus 44. A series of input data lines designated D1 through D7 are connected through a series of identical buffer drivers 196 to the data lines DB1 through DB7 carried on the internal system bus 44. The enables to all of the buffer drivers 196 are connected to a common signal line 198 created in the portion of the circuitry shown in FIG. 3. The data input lines D1 through D8 function as a parallel data input port through which external data can be transmitted into the circuitry of the transponder of FIGS. 2-6, when input is enabled by an appropriate signal on the enable line 198. The reason and functioning for this data input will be apparent following the further discussion below.

Figure 4:
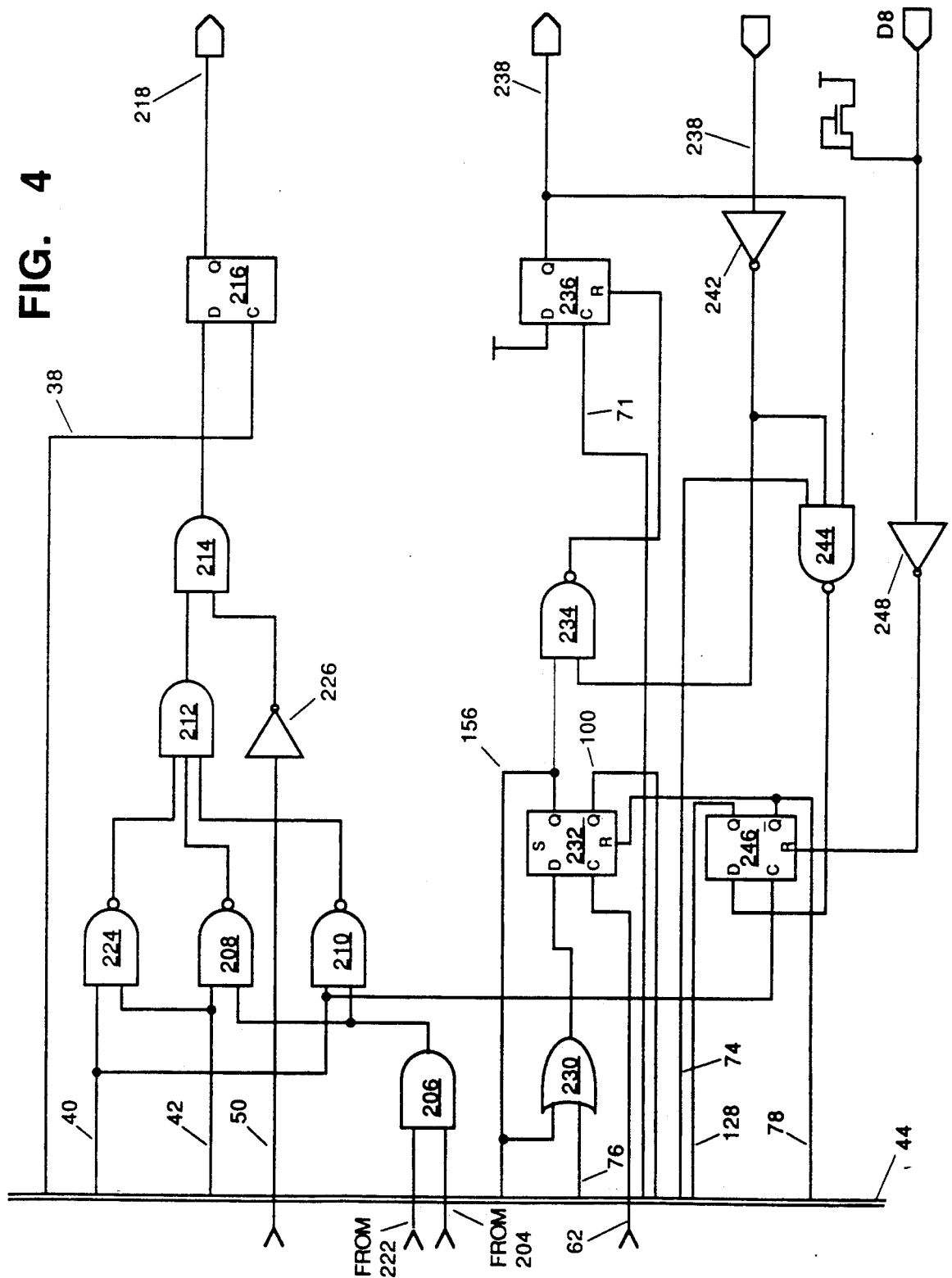
FIG. 4 is a schematic diagram of yet another portion of the circuit of the transponder of FIG. 1.

Now considering the circuitry at the very right hand portion of FIG. 3 and in FIG. 4, located in FIG. 3 is an eight channel data selector 200. Connected to the first (least significant) bit of the eight input channels to the data selector 200 is the signal line 42, which is the fc/16 or bit clock generated on FIG. 2. The next bit input to the data selector 200 comes from the output of a tri-state buffer driver 202, the input to which is the signal line 81 created by the gate 80 on FIG. 2 to indicate word zero and the enable to which is controlled by the signal line 156. This signal is connected to the data bit 1, or DB1, signal carried on the data bus 44 as well. The remaining data bits 2 through 7 input to the eight bit data channel selector 200 are connected to data bits DB2 through DB7. The data selection inputs to the eight channel data selector 200 are connected to the clock signals 48, 50, and 52, in order of the least significant bit. Since the clock signals 48, 50, and 52 are generated by divisions of the bit clock signal 42, these clock signals represent, taken together, a count of the bit times of the transmission of data. Thus the combination of those three signal lines as input bits as binary addresses into the eight channel data selector 200 causes the data selector 200 to output at its output line a serial data stream representing a fc/16 bit stream of the data presented in parallel fashion at its inputs. The data selector 200 thus functions as a parallel to serial converter, clocking serially out to its output sequentially the eight input bits provided to its input. The output from the eight channel data selector 200 is connected as an input to a NAND gate 204, the other input to which is connected to the output of the inverter 70 illustrated in FIG. 2, and carried on the system bus 44, which is the inverted signal representing bit time eight or higher, to thus disconnect the output of the data selector 200 during bit times eight and nine. The gate 204 has its output connected as one input to an AND gate 206, illustrated in FIG. 4. The output of the AND gate 206 is connected as an input to a pair of NAND gates 208 and 210, the outputs of which are connected as inputs to an AND gate 212. The output of the AND gate 212 is an input to an AND gate 214, the output of which is connected to the data input to a flip-flop 216. The clock input to the data flip-flop 216 is connected to the clock signal 38, which is the fc/4 clock, to thus clock the flip-flop 216 promptly upon the application of an input data bit thereto. The output bit of the flip-flop 216 is presented as the signal line 218 which connects to the external connector 29, and functions as the external output of the transponder circuit of FIGS. 2-6. Thus the main data flow of bits from the circuitry passes from the eight channel data selector 200 through the gate 204, the gate 206, either gate 208 or 210, gate 212, gate 214, and then to the flip-flop 216. The function of the gates 204, 206, 208, 210, 212, and 214 are not only to control the output of data, but also to do the phase encoding of the data stream passing out of the transponder.

To include a parity bit in the output data stream, a parity bit generator circuit 220 is provided. The parity generator 220 has as its inputs the data bus bit lines DB1 through DB7 carried on the system bus 44. The parity bit generator thus generates an output parity bit generated from the output data word, and that output parity bit is connected as an input to the NAND gate 222. The other input to the NAND gate 222 is the clock signal 54 which goes high, to permit the parity bit to pass, at the beginning of the eighth bit time. Since the clock signal 54 and the clock signal 71 are inversions of each other, only one of the gates 204 or 222 will be passing data at any instant. The output data from whichever gate is transmitting data will be passed through the gate 206 to the inputs to the gates 208 and 210. The other input to the gate 208 is the bit clock signal 42 which is also connected as an input to a NAND gate 224, the output of which is another input to the AND gate 212. The clock signal 40 is further connected as an input to the NAND gate 224 and to the NAND gate 210. The function of the NAND gates 208, 210, 224, and their combination added at 212 is to do the phase encoding of the output data stream received from the gate 206. The other input to the gate 214 is connected to the output of an inverter 226, the input to which is the signal 58 indicating the time for stop bit transmission, the stop bit being a simple low signal.

An OR gate 230 has two inputs, one of which is the clock signal 76, and the other of which is the signal 156. The signal 156 is created as the data output of a flip-flop 232. The data input to the flip-flop 232 is the output of the OR gate 230, while the clock input is connected to the signal line 122 which comes ultimately from the flip-flop 118 in FIG. 3. The output of the flip-flop 232 is thus a signal which is normally low but is clocked to a high when a predetermined number of clock signals 76 has passed and when the line 122 goes high as flip-flop 118 is reset by the end of a message stream. The flip-flop 232 latches itself high, by having its output connected to gate 230, until reset by a signal to its reset terminal. The output of the flip-flop 232 is also connected as an input to a NAND gate 234 the output of which is connected to the reset terminal of a flip-flop 236. The flip-flop 236 has its clock terminal connected to the signal line 71, which has a positive edge transition associated with the termination of the transmission of each data word. The flip-flop 236 thus toggles at the end of a data word when flip-flop 232 has been set by the expiration of the timer. The output of the flip-flop 236 is also connected to a signal line 238 connected through the connector 29 off of the circuit, so that signal line can be used as an external signal that information can be dumped. Its function is therefore as a "data grant" signal indicating that a request for data has been granted. A data request signal is received on a signal line 240, connected from the external connector 29, which is inverted by the inverter 242 and applied as an input to the NAND gate 234. Thus there must be a low signal applied to data request line 240 to actuate a special engineering data transfer.

A NAND gate 244 has as its inputs the data grant line 238, the output of the inverter 242, and the clock signal line 74 representing the time out of 3.4 seconds. Thus the output of gate 244 can only go low, when (1) the flip-flop 236 has been set at the end of 13.65 20 seconds, (2) the data request line 240 is pulled low, and (3) the 3.4 second clock line 74 is high. Thus, the output of the gate 244 will go high on an external request for data transfer after 17 seconds of transmission. The output of the gate 244 is connected as the data input to a reset flip-flop 246. The clock input to the reset flip-flop 246 is connected to the 4.8 kilohertz clock 40. A reset terminal to the flip-flop 246 is connected through an inverter 248 to both a power-up reset circuit, and to a terminal on the external connector 29 so that the external circuit can force the reset of the circuitry. The output of the reset flip-flop 246 consists of a signal line 78 connected to the clock generating circuitry of FIG. 2 and to the flip-flop 118 of FIG. 3. The other output of the reset flip-flop 246 is the signal line 128, connected to the gate 126 in FIG. 3 and which functions to preset the flip-flop 118. Thus the flip-flop 246 functions to reset the entire circuitry at the termination of the data transmission period.

Now that the circuitry of FIGS. 2 through 6 has been described, the overall functioning of the phase encoded transponder can be understood in greater detail. Shown in FIG. 7 is the data format for the output message transmission from the transponder of the circuit of FIGS. 2-6 on line 218. As illustrated in FIG. 7, there are eight words in the message transmitted by the transponder, designated word 0 through word 7. Each word consists of ten bits designated B0 through B9. For each word the bit B0 is a start bit. For the first word, bit one is a synchronization bit, while for the remaining words bit one is a 0. Bit two through bit seven of each data word consists of the actual data to be transmitted by the transponder. Bit eight consists of the parity bit, and bit nine consists of a stop bit for each word. The stop bit is always a null or period of no transitions.

Of the data words, words zero through three, i.e. the first four words, include within them the unique identification code associated with the unit. The identification code is a unit-unique twenty-one bit code represented by bits ID0 through ID20 as designated in FIG. 7. The bits designated W4EN, W5EN, and W6EN are preset coded flags, set in the PROM 140 to designate that words four, five or six data are to be transmitted. A flag, which is bit B8 of word four in the PROM 140, can be used to cause the system to permit external data to be imported from the external data module and then presented at its output. After all selected data words are sent, an exclusive-OR combination of the bits of the previous words is presented to the output. The transponder circuit of FIGS. 2 to 6 repetitively transmits this eight word message for a predetermined time period. After that time, the transponder may be converted to use for data streaming from the external data module, as will be described. Failing that, the transponder restarts and begins transmitting again.

The system requires a second flag before the data module words four, five and six are to be used. That flag is that bit B8 of word 4 has to be set to a logical one. When that occurs, the flag is sensed at gate 184, the inputs to which indicate word four and bit eight. This sets flip-flop 148, driving line 130 high to inhibit the PROM 140 through gate 144 of FIG. 5. At the same time, gate 124 will have its inputs go high causing gate 199 to enable line 198 to permit the input of parallel data through lines D1 through D7 and buffers 196 as shown in FIG. 6. Up to three words may be passed from the data module 26 in this fashion, with the output address lines 102 and 104, originally from the priority encoder 96, being presented on the output address lines 168 and 170 to specify the three addressable words for input to the data input bus. When the three words are completed, the enable out line 106 from the priority encoder 96 goes high to disable the input bus through gates 124 and 199. The normal transmission of the exclusive-OR word seven then can proceed.

The basic timing of the circuitry is, of course, dictated by the clocks. Clock line 42, at 2.4 kHz or fc/16, is the basic bit clock of the system, setting the bit transmission rate. Since there are ten bits per word, BCD counter 46 counts bits in each word. The output of gate 56, the sum of bits one and eight, represents bit nine or the stop bit. The occurrence of stop bits is counted by BCD counter 60 which counts words. Counter 72 merely divides the fc/160 signal on line 54 to generate a signal of seventeen seconds in duration.

The successive data words are transferred out of the PROM 140 and placed on data bus lines DB2 through DB7. From the bus, the data words are clocked into the eight-channel data selector 200 and converted t serial form. The first bit space of each word, bit B0, is determined by the first bit input to the data selector 200, which is the bit clock signal 42. So the first bit of each word is a dual square wave, or start bit, each wave having a 104 microsecond high and low. The synchronization bit is a one bit in word zero and a zero bit in all other words. After the data bits are transmitted through gate 204, line 71 goes low no data passes gate 204. Meanwhile, signal 54 is high for bits eight and nine to permit the parity generator 220 to pass the parity bit in position eight. The stop bit, which is a period of quiet, is imposed signal line 58 which forces a low to the output flip-flop 216 during the stop bit time.

Figure 8:
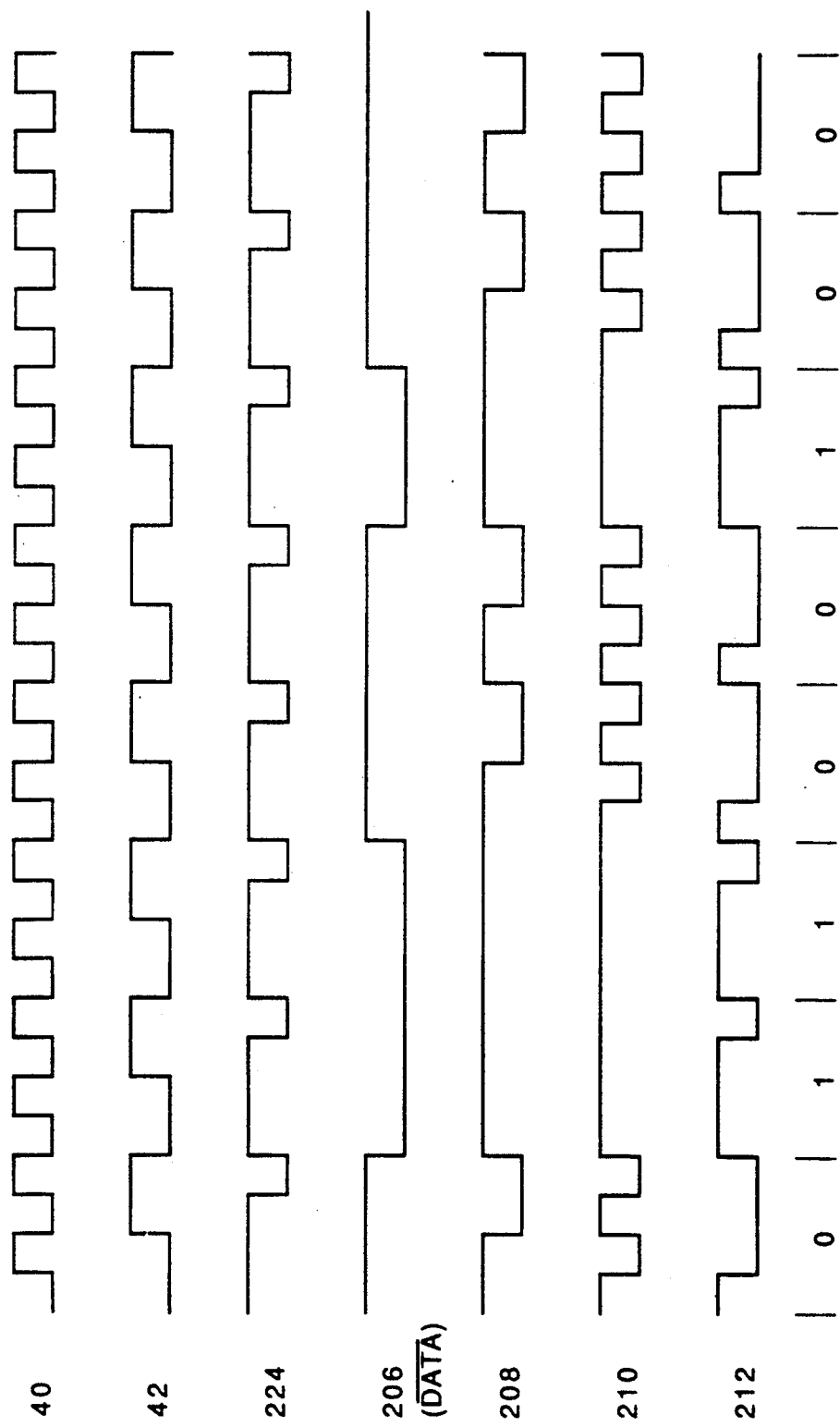
FIG. 8 is a timing diagram for the output circuit of FIG. 6.

Shown in FIG. 8 is a timing diagram to illustrate the phase encoding of the circuit. The clock signals 40 and 42 are labeled. The output of gate 206 is the data stream, here 01110010. The output of gates 224, 208, 210 and 212 are illustrated. The output of gate 212 is, of course, clocked directly into the flip-flop 216 as the output signal 218. At the start of each bit time, the signal experiences a transition, i.e. the carrier in the RF transmitter 24, is turned on or off. For a logical one, the carrier is left on for 312 microseconds after which it is off for 104 microseconds. For a logical zero, it is on for 104 microseconds and then off for 312 microseconds. The result is a phase encoded signal with good noise separation and efficient data transfer.

Again returning to the concept of how the system processes the words to be transmitted. During word zero, the address lines 64, 66, and 68 are passed through the address register selector 160, and address the word zero in the PROM 140. Word zero is placed on the data bus and its fifth, sixth and seventh bits indicate whether simply the identification code is to be transmitted, or if additional information is to be transmitted as words four, five and six. If such additional word is to be transmitted, the appropriate internal or external word enable bits are made high. If the appropriate word enable bit is high, one or more of the word enable latches is clocked during word zero by the output of gates 82 and 86. If, after words zero through three have been transmitted, additional bits are desired to be transmitted, the appropriate latch 90, 92, or 94 are high. The outputs of those latches are transmitted to the eight bit priority encoder 96, which creates outputs on lines 102 and 104. The output lines 102 and 104 are presented as inputs to the address output buffers 174 and 176. The external importation of data is signaled by a one bit at bit B8 of word four in the PROM 140. If that bit is a one, during word four the output of gate 184 goes high and flip-flop 148 is set. The output of these two address buffers 174 and 176 are enabled by the output of gate 188, which is enabled by the flip-flop 146. Thus during words 4 through 7, the output of gate 184 is high, the flip-flop 148 is clocked positive, and the output gates 174 and 176 are enabled so that an address is presented on lines 168 and 170 to the data module 28 through the external connector 29. The address is two bits in length since only three words are permitted.

If the external data is to be read, the enable line 198 needs to be enabled to receive the external data when presented by the data module. Thus the signal line 198 is controlled by the gate 199. When one of the inputs to the eight bit priority encoder has been enabled, the line 106 is negative which causes the output of inverter 116 to be positive. Then when signal line 130 is high, indicating that the flip-flop 148 has been set for enabling the address bus, both inputs to gate 124 are high driving one of the inputs to gate 199 high, driving line 198 to operate the data buffer drivers 196. If a data word is presented on the input data bus of bits D1 to D7, it is presented on the system data bus 44 just like any other data word which might come out of the PROM 140. Upon the selection of words four, five, or six as presented to the eight channel data selector by the signal lines 48, 50, and 52, the appropriate external words are converted from parallel to serial form, and conveyed to the output of the circuit in the same fashion as the output words from the PROM 140. If any of the latches 90, 92, or 94 are enabled, as the appropriate word is transmitted by the circuit, the BCD to decimal converter 112 pulses the appropriate line for each word, as the word is reached, and to reset the appropriate latch. Accordingly, when the end of word six is reached, the enable output of the eight bit priority encoder 96 returns to a one, thus forcing the output of the inverter 116 low, and terminating the actuation of the input data buffer activating line 198.

During the last word, of course, the exclusive-OR circuit is actuated as illustrated in FIG. 5. The circuit has been continually performing an exclusive-OR operation on each data word as it is transmitted by the circuitry, as has been discussed above whether the word originated in the PROM 140 or was imported from the data module 28. When it is time to transmit the last word, the line 107 must therefore be enabled to impose data word seven on the system data bus. Signal line 107 is simply the output of the inverter 116 of FIG. 3, which goes low for a time of one word length at the appropriate time for the last word. Thus the exclusive-OR error check word is also imposed on the data bus, converted to serial form and phase encoded like the rest of the message.

At the time of the stop bit during the last word, the flip-flop 118 is clocked to a low. This causes signal line 62 to reset the word counter 60. The system thus recycles and continues transmitting again at word zero.

This process continues until the time period of clock signal 76 expires. At that juncture, the input to gate 230 in FIG. 4 goes high and flip-flop 232 is clocked high when the signal line 62 next resets the word counter at the end of a message. The setting of flip-flop 232 has several effects through signal lines 100 and 156. The priority encoder 96 is inhibited through gate 98. The PROM is inhibited through gate 150 (FIG. 5). The address output driver 170 is enabled through gate 190 and a one forced therethrough. The input data bus is enabled through gate 199. All of these actions are for the purpose of enabling yet another alternative mode of operation of the circuit of FIGS. 2–6, the transmission of unlimited streaming data. This is done if the external device, namely the optional data module 28, imposes a low signal on input line 240, the data request line in FIG. 4. If this occurs, when flip-flop 232 goes high, flip-flop 238 is reset to impose a logical zero on data request grant output 238. Then the data module can output word after word on the data bus, through lines D1 to D8 and data input buffers 196. The bit counters continue to function and the phase encoding proceeds normally. The circuit thus continues to transmit as long as line 240 is held by the external device.

If, when flip-flop 232 is set, there is no external data request, the reset flip-flop 246 is clocked off. This resets clock counters 46 and 72, and the flip-flop 232 to prepare the system to recycle. Thus, data transmission restarts and the message is repeated for another seventeen seconds.

Thus the phase encoded transponder of the present invention efficiently permits not only an identification code to be transmitted, but permits the same phase encoding transmitting circuitry to be used to send any other desired internal or external data about the subject to the interrogating unit. For animal husbandry, this permits the ID transponders, once installed, to be used for a host of other measurements of animal performance. It also permits the transponder to be used in other fields where both transmission of identification and other data is required.

It is to be understood that the present invention is not limited to the particular embodiments disclosed herein, but embraces all such modified forms thereof as come within the scope of the following claims.

What is claimed is:

1. A state variable phase encoded transponder circuit for use in a device for the transmission of identification and other data from the device to an interrogating unit comprising
   a memory portion containing stored data including an identification code and three data word enable flags and an external data enable flag;
   a data bus connected to carry data from the memory portion;
   timing circuitry connected to address the memory portion to access stored data including the identification code therein and to cause it to be transferred from the memory in a series of words in parallel on the data bus;

parallel to serial data conversion means connected to the data bus to convert data thereon into a serial phase encoded data stream;

three data enable latches connected to the data bus to test for the external data word enable flags;

a parallel input external data bus connected so as to be capable of providing external data to the data bus;

gating means connected for operating the external data bus only when the data enable latch has been activated by the external data enable flag, the gating means being further connected to the timing means to enable the external data bus only during times which do not conflict with the transmission of the identification code from the memory so that the identification code and parallel input data may be converted by the parallel to serial conversion means into a common serial data stream; and wherein the message transmitted by the circuit is up to eight words in length, and wherein the other data to be transmitted is any combination of the fifth, sixth and seventh words of the message.

2. A state variable phase encoded transponder circuit for use in a device for the transmission of identification and other data from the device to an interrogating unit comprising a memory portion containing stored data including an identification code and one or more data word enable flags and external data enable flags;

a data bus connecting to the memory portion to carry data therefrom;

timing circuitry to address the memory portion to access stored data including the identification code therein and to cause it to be transferred from the memory to the data bus in a series of words in parallel;

parallel to serial data conversion means connected to the data bus to convert data thereon into a serial phase encoded data stream;

at least one data enable latch connected to the data bus to test for the external data word enable flag;

a parallel input external data bust connected to input its data onto the data bus; and gating means connected for operating the external data bus only when the data enable latch has been activated by the external data enable flag, the gating means being further connected to the timing means to enable the external data bus only during times which do not conflict with the transmission of the identification code from the memory so that the identification code and parallel input data may be converted by the parallel to serial conversion means into a common serial data stream.

3. A state variable phase encoded transponder circuit for use in a device for the transmission of identification and other data from the device to an interrogating unit comprising a memory portion containing stored data including an identification code and one or more data word enable flags and external data enable flags;

a data bus connected to carry data from the memory portion;

timing circuitry connected to address the memory portion to access stored data including the identification code therein and to cause it to be transferred from the memory in a series of words in parallel on the data bus connected to the data bus;

parallel to serial data conversion means connected to the data bus to convert data thereon into a serial phase encoded data stream;

three data enable latches connected to the data bus to test for the external data word enable flag;

a priority encoder, the inputs to which are the outputs of the data word enable latches;

a parallel input external data bus;

gating means connected for operating the external data bus only when one of the data enable latches has been activated by the external data enable flag, the gating means being further connected to the timing means to enable the external data bus only during times which do not conflict with the transmission of the identification code from the memory so that the identification code and parallel input data may be converted by the parallel to serial conversion means into a common serial data stream; and the output of the priority encoder being connected as externally accessible address lines which are adapted to be connected so that an external device applying data to the parallel input external data bus can be addressed on a word by word basis.

4. A phase encoded transponder circuit as claimed in claim 3 wherein the memory is a programmable read-only memory.

5. A state variable phase encoded transponder circuit for use in a device for the transmission of identification and other data from the device to an interrogating unit comprising a memory portion containing stored data including an identification code and one or more data word enable flags and external data enable flags;

a data bus connected to carry data from the memory portion;

timing circuitry to address the memory portion to access stored data including the identification code therein and to cause it to be transferred from the memory in a series of words in parallel to the data bus;

parallel to serial data conversion means connected to the data bus to convert data thereon into a serial phase encoded data stream;

at last one data enable latch connected to the data bus to test for the external data word enable flag;

a parallel input external data bus connected so as to be capable of presenting external data to the data bus;

grating means connected for operating the external data bus only when the data enable latch has been activated by the external data enable flag, the gating means being further connected to the timing means to enable the external data bus only during times which do not conflict with the transmission of the identification code from the memory so that the identification code and parallel input data may be converted by the parallel to serial conversion means into a common serial data stream; and wherein the circuit transmits an eight word message and the gating means is connected to the timing circuitry to only permit the input external data bus to be enabled during the second four words of the message transmission.

6. A phase encoded transponder circuit as claimed in claim 5 wherein there is further a parity generator in the parallel to serial conversion means to generate a parity bit at the end of end word transmission.

7. A state variable phase encoded transponder circuit for use in a device for the transmission of identification and other data from the device to an interrogating unit comprising a memory portion containing stored data including an identification code and one or more data word enable flags and external data enable flags;

a data bus connected to carry data from the memory portion;

timing circuitry connected to address the memory portion to access stored data including the identification code therein and to cause it to be transferred from the memory in a series of words in parallel on the data bus;

parallel to serial data conversion means connected to the data bus to convert data thereon into a serial phase encoded data stream;

at least one data enable latch connected to the data bus to test for the external data word enable flag;

a parallel input external data bus connected so as to be capable of presenting external data to the data bus;

grating means connected for operating the external data bus only when the data enable latch has been activated by the external data enable flag, the gating means being further connected to the timing means to enable the external data bus only during times which do not conflict with the transmission of the identification code from the memory so that the identification code and parallel input data may be converted by the parallel to serial conversion means into a common serial data stream; and an exclusive-OR word generator circuit connected to receive input data from the data bus to perform an exclusive-OR function with the words on the data bus, the output of the exclusive-Or circuit also connected to the data bus and being selected by the timing means to be presented to the data bus so that the cumulative exclusive-OR product word is presented to the data bus for transmission as a word of the transmitted message.

8. A state variable phase encoded transponder circuit for use in a device for the transmission of identification and other data from the device to an interrogating unit comprising a memory portion containing stored data including an identification code and one or more data word enable flags and external data enable flags;

a data bus connected to carry data from the memory portion;

timing circuitry to address the memory portion to access stored data including the identification code therein and to cause it to be transferred from the memory in a series of words in parallel on the data bus;

parallel to serial data conversion means connected to the data bus to convert the data thereon into a serial phase encoded data stream;

at least one data enable latch connected to the data bus test for the external data word enable flag;

a parallel input external data bus connected to present external data to the data bus;

gating means connected for operating the external data bus only when the data enable latch has been activated by the external data enable flag, the gating means being further connected to the timing means to enable the external data bus only during times which do not conflict with the transmission of the identification code from the memory so that the identification code and parallel input data may be converted by the parallel to serial conversion means into a common serial data stream; and a predetermined period timer which is connected to an external data latching means so as to permit, when the predetermined period timer elapses, an external device to transmit an unlimited data steam through the circuit using the input external data input bus to enter the data.

9. A phase encoded transponder circuit for use in a passive transponder for the transmission of identification and other data from the transponder to an interrogating unit comprising a memory containing data including a previously loaded identification code, at least one data word enable flags, and an external data flag;

a data bus connected to receive data from the memory;

timing circuitry connected to address the memory to access the data therein and to cause the data in the memory to be transferred from the memory to the data bus in a series of words in parallel;

parallel to serial data and phase conversion means connected to the data bus to convert the parallel words on the data bus into a serial phase encoded data stream;

at least one word enable latch connected to the data bus to test for the presence of the data word enable flag on the data bus;

a parallel input data bus connected to the data bus to be able to accept input data from an external source and present it on the data bus;

a latch connected to the data bus for testing for the presence of the external data flag; and gating means connected for operating the parallel input data bus only when the word enable latch has been activated by the data word enable flag; the gating means being further connected to the latch testing for the external data flag so that if the flag is set, the external parallel input bus is enabled to accept input data and if the flag is not set, data is read only from the memory, so that all data on the data bus may be converted by the parallel to serial conversion means into a common serial data stream wherein the transponder normally transmits up to an eight word message, the first word containing bits designated as the word enable flags.

10. A phase encoded transponder circuit as claimed in claim 9 wherein there are three word enable flags corresponding to the fifth, sixth and seventh words of the eight word message.

11. A phase encoded transponder circuit as claimed in claim 9 wherein there is also an exclusive-OR generating circuit connected to the data bus for performing an exclusive-OR function on the combined first seven words, the output of the exclusive-OR being presented on the data bus and transmitted as the last word in the eight word message.

12. A phase encoded transponder circuit as claimed in claim 9 wherein the identification code is contained in the first four words of the message, and wherein the external data flag is a bit in one of those first four words.

13. A phase encoded transponder circuit for use in a passive transponder for the transmission of identification and other data from the transponder to an interrogating unit comprising a memory containing data including a previously loaded identification code, more than one data word enable flags, and an external data flag;

a data bus connected to receive data from the memory;

timing circuitry connected to address the memory to access the data therein and to cause the data in the memory to be transferred from the memory to the data bus in a series of words in parallel;

parallel to serial data and phase conversion means connected to the data bus to convert the parallel words on the data bus into a serial phase encoded data stream;

more than one word enable latch connected to the data bus to test for the presence of the data word enable flag on the data bus;

a priority encoder connected to the word enable latches to generate an address therefrom which may be accessed by an external device to select the external data words for presentation on the external data bus;

a parallel input data bus connected to the data bus to be able to accept input data from an external source and present it on the data bus;

a latch connected to the data bus for testing for the presence of the external data flag; and gating means connected for operating the parallel input data bus only when the word enable latch has been activated by the data word enable flag; the gating means being further connected to the latch testing for the external data flag so that if the flag is set, the external parallel input bus is enabled to accept input data and if the flag is not set, data is read only from the memory, so that all data on the data bus may be converted by the parallel to serial conversion means into a common serial data stream.

14. A method of operating a transponder for the transmission of identification information and also for enabling the optional transmission in the same transponder of optional external data comprising the steps of providing a transponder including: a memory portion including a fixed identification code and more than one word enable flag; a data bus connected to receive data from the memory portion; a parallel to serial and phase encoding circuit connected to convert parallel data on the data bus to a phase encoded serial data stream; timing circuitry connected to control the operation of the parallel to serial and phase encoding circuit; and at least one word enable latch connected to the data bus to test for the word enable flag is present on the bus to determine if the optional external data transmission is to be performed;

commencing a data message by the entry of information from the memory onto the data bus;

checking the flag in the identification code, and if it is set, setting the appropriate word enable latch;

if no word enable latch is set, at the termination of the transmission of the identification code, recommencing the transmission of the identification code;

if one word enable latch is set, at the termination of the transmission of the identification code, enabling a parallel input data bus which data is then converted and encoded in the same fashion as the identification code, and then recommencing the transmission of the identification code; and if more than one word enable flag is set, prioritizing among the word enable latches and using the prioritizing data to create an address bus so that multiple words of external data may be transmitted.

15. A method of operating a transponder for the transmission of identification information and also for enabling the optional transmission in the same transponder of optional external data comprising the steps of providing a transponder including: a memory portion including a fixed identification code and more than one word enable flags imbedded in the first word of data; a data bus connected to receive data from the memory portion, a parallel to serial and phase encoding circuit connected to convert parallel data on the data bus to a phase encoded serial data stream; timing circuitry connected to control the operation of the parallel to serial and phase encoding circuit; and at least one word enable latch connected to the data bus to test for the word enable flag is present on the bus to determine if the optional external data transmission is to be performed;

commencing a data message by the entry of information from the memory onto the data bus;

checking the flag in the identification code, and if it is set, setting the appropriate word enable latch;

if no word enable latch is set, at the termination of the transmission of the identification code, recommencing the transmission of the identification code; and if one word enable latch is set, at the termination of the transmission of the identification code, enabling a parallel input data bus which data is then converted an decoded in the same fashion as the identification code, and then recommencing the transmission of the identification code.

16. A method of phase encoding a serial data stream consisting of data bits which are either true or false for transmission of coded identification information on a carrier from a phase encoded transponder comprising the steps of transmitting a start bit of the data stream comprising a square wave of the carrier, the period of the square wave of the start bit selected to include two complete square waves in one single bit time;

at the commencement of each subsequent bit time, transmitting the carrier;

if the bit for the bit time is true, maintaining the carrier for substantially three-quarters of the bit time, after which the carrier transmission is ceased for the remaining one-quarter of the bit time;

if the bit for the bit time is false, maintaining the carrier for substantially one-quarter of the bit time after which the carrier transmission is ceased for the remaining three-quarters of the bit time.

* * * * *